Figure 1:
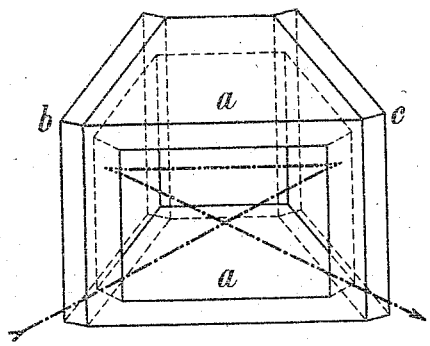

O. EPPENSTEIN.
OPTICAL SQUARE.
APPLICATION FILED MAR. 15, 1910.

995,235.

Patented June 13, 1911.

Witnesses:
Paul Krüger
Richard Hahn

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

OPTICAL SQUARE.

995,235.  Specification of Letters Patent.  Patented June 13, 1911.

Application filed March 15, 1910. Serial No. 549,555.

*To all whom it may concern:*

Be it known that I, OTTO EPPENSTEIN, a citizen of the German Empire, residing at Carl-Zeiss strasse, Jena, in the Grand Duchy of Saxe-Weimar, Germany, have invented a new and useful Optical Square, of which the following is a specification.

The invention consists in an improvement in optical squares, the two reflecting bodies of which are fixed to an intermediate member and consist each of a silvered glass plate. When such optical squares are in a condition, where they receive heat from without or spend heat outward, the reflecting surfaces undergo—even when the coefficients of expansion of the metallic intermediate member and the glass plates are equal—as the observation of the reflected images has shown, a deformation, which varies according to the manner in which the plates are fixed to the intermediate member. When such an optical square forms a constituent part of a measuring instrument, a telemeter for example, this instrument is as long deranged as the condition stated lasts. According to the investigations, from which the present invention has taken its origin, there must be regarded as the cause of the deformation a considerable difference between the mean temperatures of the intermediate member on one side and of the plates on the other side, and this difference is to be regarded as the effect of the circumstance that the thermal conductivity of the metallic intermediate member is a high multiple of the thermal conductivity of the glass plates.

The invention consists in so selecting the material for the intermediate member that the thermal conductivity of the latter is about equal to that of the plates. According to the actual relation between the dimensions of the intermediate member and the size of the plates, the mentioned difference of the mean temperatures is found to be more or less reduced. Among the materials with the low thermal conductivity of the glass and with sufficient strength, the glass itself should be taken notice of. An intermediate member of glass can even be made integral with the two plates.

In the drawing some constructional examples of the invention are represented by perspective views. All of them are optical squares deflecting by 90°, the angle between the mirrors being 45° in the first four figures and 135° in Figure 5.

In the optical square according to Fig. 1 the intermediate member $a$ is a casing with three openings, the front one of which serves for the entrance and exit of light, whereas the two lateral ones are closed by silvered glass plates $b$ and $c$ cemented on the casing.

Figure 2:
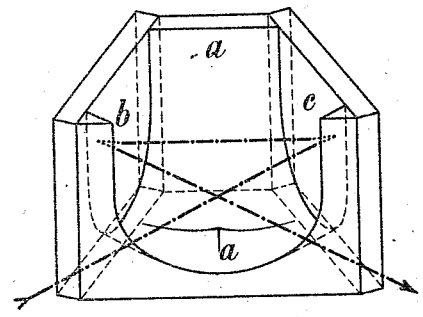

When the lower part of the hollow space of the optical square is rounded so as to correspond to a cylinder of rays, the broken axis of which is shown, and when at the same time its covering wall is omitted, the optical square according to Fig. 2 results.

Figure 3:
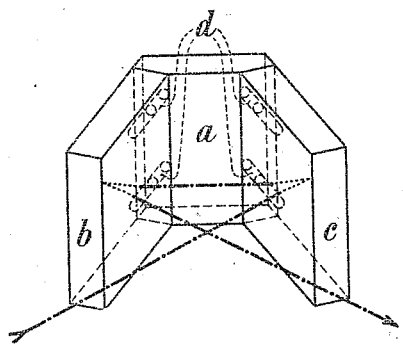

The example of Fig. 3 represents an optical square, which is open also at the bottom. The intermediate member $a$ consists only in a hinder cross piece, which is connected with the plates $b$ and $c$ by pins $d$.

Figure 4:
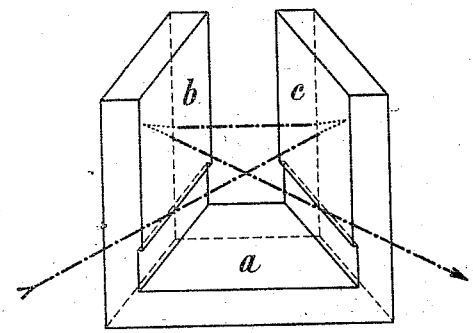
Figure 5:
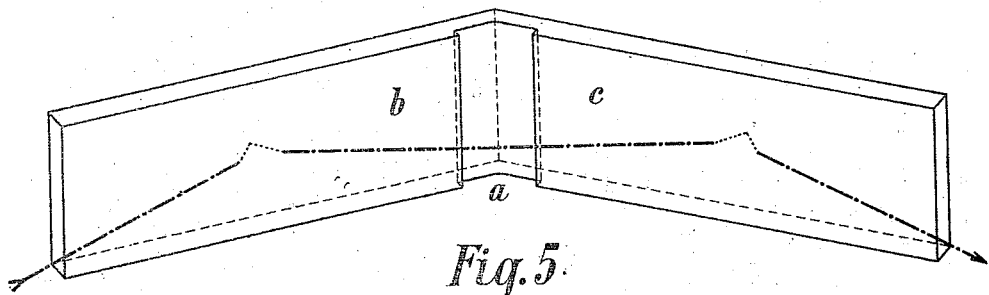

In the examples of Figs. 4 and 5 glass is supposed to be the material of the intermediate member $a$, the latter being integral with the plates $b$ and $c$.

I claim:

1. An optical square consisting of two silvered glass plates and an intermediate member, these three parts having about the same thermal conductivity.

2. An optical square consisting of two silvered glass plates and an intermediate glass member.

3. An optical square consisting of two silvered glass plates and an intermediate glass member integral with the plates.

OTTO EPPENSTEIN.

Witnesses:
 PAUL KRÜGER,
 ALFRED MACKEDANZ.